United States Patent Office 3,289,469
Patented Dec. 6, 1966

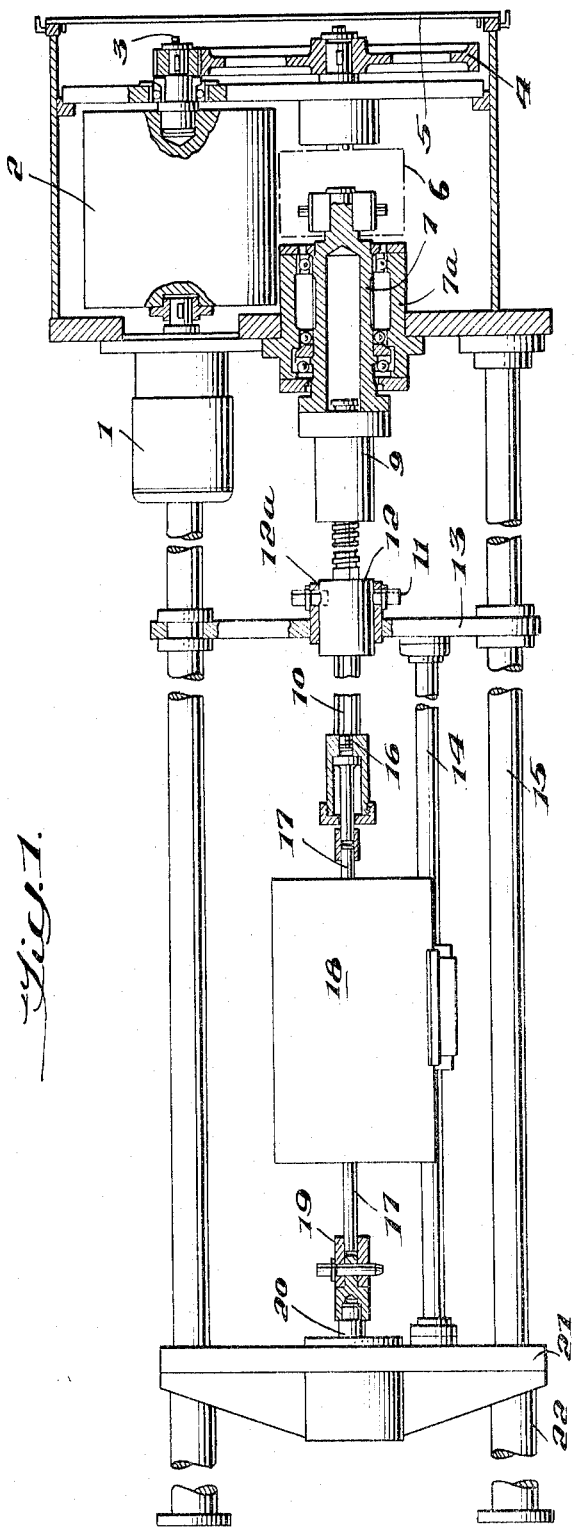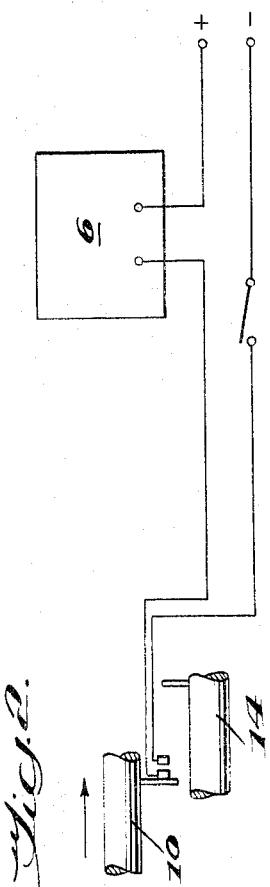

3,289,469
MEANS OF PROVIDING CONTROLLED INTERMEDIATE STRAIN RATES FOR THE TESTING OF MATERIALS UNDER UNIAXIAL IMPACT LOADING CONDITIONS
Joseph M. Wentzell, Robert A. Woodall, and Thomas H. Millar, Whitesboro, N.Y., assignors, by mesne assignments, to Special Metals Corporation, a corporation of Delaware
Filed Oct. 17, 1963, Ser. No. 316,975
9 Claims. (Cl. 73—95)

This invention relates to testing apparatus for measuring stresses or strains of materials, and is concerned with the provision of improved metals-testing apparatus operating at controlled intermediate strain rates.

It is well known that measurements of the mechanical properties of materials may often vary as a function of the strain rate at which the material is being deformed. The teachings of Nadai et al. (U.S. Patent No. 2,323,724) are useful in understanding the need for investigating the properties of materials, particularly metals, at various strain rates. However, Nadai failed to recognize that there are several commercial hot working practices involving metals, as for example, pressing, in which strain rates much less than the 100 per second minimum quoted by him are realized. By a similar argument, it is equally useful to study the properties of materials at the lower strain rates. Indeed, several current research reports, particularly in the field of plastic materials, have substantiated this argument.

The object of the present invention is to provide, primarily for the metals testing field, a means of studying strain rate effects under adequately controlled conditions over the intermediate range of speeds between those of conventional driven testing machines (about 20 per minute) to drop weight impact types (about 6000 per minute). In order that the strain rates produced be adequately controlled for sound scientific analysis, a further object of our invention requires that the velocity of the movable loading member be held constant within rather narrow limits (about 2½-percent of nominal) throughout any given test. Such object requires that relatively very large amounts of energy be available in very short times so that the energy extracted from the testing system in loading and breaking the test sample does not appreciably alter the system momentum. This may be accomplished in one of two ways:

(a) The use of prohibitively large power sources, which become harder to control as their capacity increases; or (b) Storage of energy in the system capable of very quick delivery to the loading member as required.

Method (b) above offers the only hope of a commercially feasible system. Hence it is not surprising that there have been many attempts to produce systems which store sufficient energy for velocity during impact loading control. To our knowledge, however, all of the previously suggested systems have attempted (a) to store energy in hydraulic or gas accumulators and (b) to control velocity by controlling the rate at which the stored energy is delivered to the loading member. Such systems utilize servo valves for rate control and have proved to be adequate only when the load on the system changes very slowly, as might be the case in testing very soft plastic materials. However, in the case of testing materials having higher moduli of elasticity, as for example, metals, a change from zero to full system load may be required in as little time as $10^{-5}$ seconds. This corresponds to a frequency of 25,000 cycles per second, and far exceeds the response capabilities of flow control servo valves.

Ordinary drop weight impact testers do not have sufficient energy capacity at the velocities of interest in the current invention, and are characterized by velocity losses much greater than 2.5-percent even at higher velocities. The disclosures of Nadai et al. describe a machine in which energy is stored in a flywheel, but the useful lower velocity of their machine is limited since their loading member is attached to the periphery of the flywheel and energy capacity varies with the square of velocity. Further, a loading mechanism of the type described by Nadai et al. does not provide uniaxial loading of specimens, thereby setting up triaxial stresses and introducing an additional variable into the test parameters. Conventional screw-driven machines have consistently proved incapable of attaining velocities in excess of about 200-inches per minute and are practically limited to about 20-inches per minute.

The current invention employs a variable speed, but moderately powered, hydrostatic drive operating a flywheel which acts as an energy sink. The loading element is driven off the flywheel by a gear train, with a fixed ratio for each speed range, an air actuated positive action clutch-brake, and a rotating ball nut. The load provided by the loading member and the displacement of the loading member are instrumented by conventional means.

The invention will now be described with greater particularity and with reference to the accompanying drawing, in which FIG. 1 is a diagrammatic representation of an embodiment of the principles of the present invention; and FIG. 2 diagrammatically illustrates means for limiting the extent of axial displacement of the pulling member of the testing apparatus.

In the drawing, a positive displacement variable speed fluid motor 1, which is part of a hydrostatic drive system (the conventional fluid pump and conventional primary electric motor are not shown), directly drives a flywheel 2 at any required speed, within the range, and provision is made for a tachometer generator (not shown) drive shaft take-off point 3. The stored energy in the flywheel is transmitted through a change gear system 4 consisting of a series of fixed ratio gears to give a pre-chosen speed range to the system. The gears are easily accessible through removable cover 5 and are changed to the required speed range before motor 1 is activated. The change gear 4 is directly connected to an electro-pneumatically operated clutch-brake 6, of the type disclosed in Bulletin 101 (published 1962) by Force Control, Inc., New Castle, Indiana. The clutch side of this clutch-brake is positively connected to a hollow shaft 7, and this latter is mounted in a bearing housing 7a which is fixed to a main housing member 8. The hollow shaft is bolted to a ball nut 9 and linearly drives a combination ball screw-ball spline shaft 10 which is kept from rotating by the engagement of pins 11 inserted into the ball spline nut 12 through a housing 12a that is permanently attached to a support member 13. Support member 13 supports a heating furnace mounting shaft 14 and is supported by main columns 15. The ball screw-ball spline shaft 10 is screwed into a slack adapter 16 and this latter in turn, is attached to a specimen adapter 17. The specimen adapter is easily connected to the specimen which may, if required, be heated to the desired temperature by a resistance heating furnace 18. Specimen adapter is also connected to a clevis 19 and the clevis is screwed to a load cell adapter 20. The load cell is housed in a main support member 21 and the whole is supported by stands 22.

*Method of operation*

Assumed cycle position:
(1) Proper ratio gears 4 installed for required testing speed range.
(2) Hydraulic motor 1 and flywheel 2 running at desired speed for the particular test.
(3) Brake in 6 engaged; clutch disengaged.
(4) Pins 11 inserted in spline nut 12.
(5) Slack adapter 16 adjusted to have maximum free travel.
(6) Specimen inserted and heated to desired temperature by furnace 18.
(7) All necessary instruments recording or at stand by.

If all criteria above are satisfied then: a manually operated start button will: disengage brake and simultaneously engage clutch; this starts clutch 6, shaft 7, and ball nut 9 rotating, resulting in the linear movement of screw-spline shaft 10. Slack adapter 16 allows sufficient free movement to permit the clutch to be fully locked before the load (to break specimen) is applied. After specimen breaks, a limit switch (not shown) activated by screw-spline shaft movement releases clutch and simultaneously applies brake to stop items 6, 7, 9 and 10 before screw bottoms on hollow shaft. The motor and flywheel continue rotating. The flywheel speed change, if appreciable, is noted on a recorder which is fed from the tachogenerator.

Specimen, specimen adapter 17, slack adapter 16, and clevis 19 are removed and furnace 18 is rotated (opened if split type) about 14 to facilitate assembly for next specimen test. Pins 11 are withdrawn to allow spline nut and spline-screw shaft to rotate and descend to original starting position for next test.

Steps 1–7 are then checked through and start button is depressed for next test.

The stress-strain characteristics of the specimen are measured on any suitable read-out device responsive to the load cell. An operable load cell is that manufactured and sold by Kistler Instrument Corporation, Clarence, New York, their Model No. 902, which employs a load cell adapter secured to a main support frame by means of a preloaded stud, and a quartz load washer.

The above-described testing apparatus provides uniaxial loading, with loading member velocities—controlled within a maximum of ±2.5%—under rapidly changing load conditions, over a range of velocities from about 20 inches per minute to about 6,000 in./min. The apparatus may be so designed and structured as to deliver loads up to 10,000 pounds over a displacement of two inches. The specimen may be heated to controlled elevated temperatures, up to about 4,000° F., while in the test position.

We claim:

1. A uniaxial-loading metals-testing apparatus operating at controlled intermediate strain rates, comprising, in combination,
   a motor-driven flywheel having a shaft;
   a change speed gear system driven from said flywheel shaft;
   a clutch-brake mechanism having an input shaft coupled to said gear system and an output shaft;
   a ball nut rotatable by the output shaft of said clutch-brake mechanism;
   a screw shaft threaded at one end within said ball nut, said screw shaft being mounted for non-rotational axial displacement within said ball nut;
   means including a slack adapter, said means connecting the other end of said screw shaft to one end of a specimen to be tested; and
   means anchoring the other end of such specimen.

2. The testing apparatus defined in claim 1, wherein a hydrostatic drive system including a positive displacement, variable speed, fluid motor drives said flywheel.

3. The testing apparatus defined in claim 1, wherin said change speed gear system is constituted by intermeshed gears of selected diameters, one of said gears being mounted on said flywheel shaft and another of said gears being mounted on said input shaft of said clutch-brake mechanism.

4. The testing apparatus defined in claim 1, wherein a rotatable hollow shaft is connected to said output shaft of said clutch-brake mechanism, said ball nut being mounted on said hollow shaft, said screw shaft being adapted to be axially displaced within said hollow shaft.

5. The testing apparatus defined in claim 1, wherein said screw shaft is part of a combination ball screw-ball spline shaft.

6. The testing apparatus defined in claim 5, wherein a ball spline nut is operatively associated with the splined part of said combination ball screw-ball spline shaft, with said ball spline nut being non-rotatively mounted in a stationary housing therefor.

7. The testing apparatus defined in claim 1, wherein a specimen adapter secured to said screw shaft constitutes part of said means connecting said screw shaft with a specimen.

8. The testing apparatus defined in claim 1, including means for heating a specimen while under test.

9. A uniaxial-loading metals-testing apparatus operating at controlled intermediate strain rates, comprising, in combination,
   a hydrostatic drive mechanism including a positive displacement, variable speed, fluid motor;
   a flywheel driven by said fluid motor, said flywheel having a shaft;
   a clutch-brake mechanism having an input shaft and an output shaft;
   a change speed gear system constituted by intermeshed gears of selected diameters, one of said gears being mounted on said flywheel shaft and another of said gears being mounted on said input shaft;
   a ball nut rotatable by the output shaft of said clutch-brake mechanism;
   a combined ball screw-ball spline shaft threaded at one end thereof within said ball nut, said combined ball screw-ball spline shaft being mounted for non-rotational axial displacement within said ball nut;
   a rotatable hollow shaft rotatably connected to said output shaft of said clutch-brake mechanism, said ball nut being mounted on said hollow shaft, said combined ball screw-ball spline shaft being adapted to be axially displaced within said hollow shaft;
   a non-rotationally mounted ball spline nut operatively associated with the splined part of said combined ball screw-ball spline shaft;
   a specimen adapter by which one end of a specimen can be grasped;
   means anchoring the other end of such specimen;
   a slack adapter joining said combined ball screw-ball spline shaft with said specimen adapter; and
   means for heatng a specimen while grasped between said specimen adapter and said anchoring means.

References Cited by the Examiner

UNITED STATES PATENTS

| | | | |
|---|---|---|---|
| 445,476 | 1/1891 | Olsen | 73—93 |
| 2,978,900 | 4/1961 | Lee | 73—93 |
| 3,203,232 | 8/1965 | Lehnig | 73—93 |

RICHARD C. QUEISSER, *Primary Examiner.*

JERRY W. MYRACLE, *Assistant Examiner.*